Patented Sept. 9, 1952

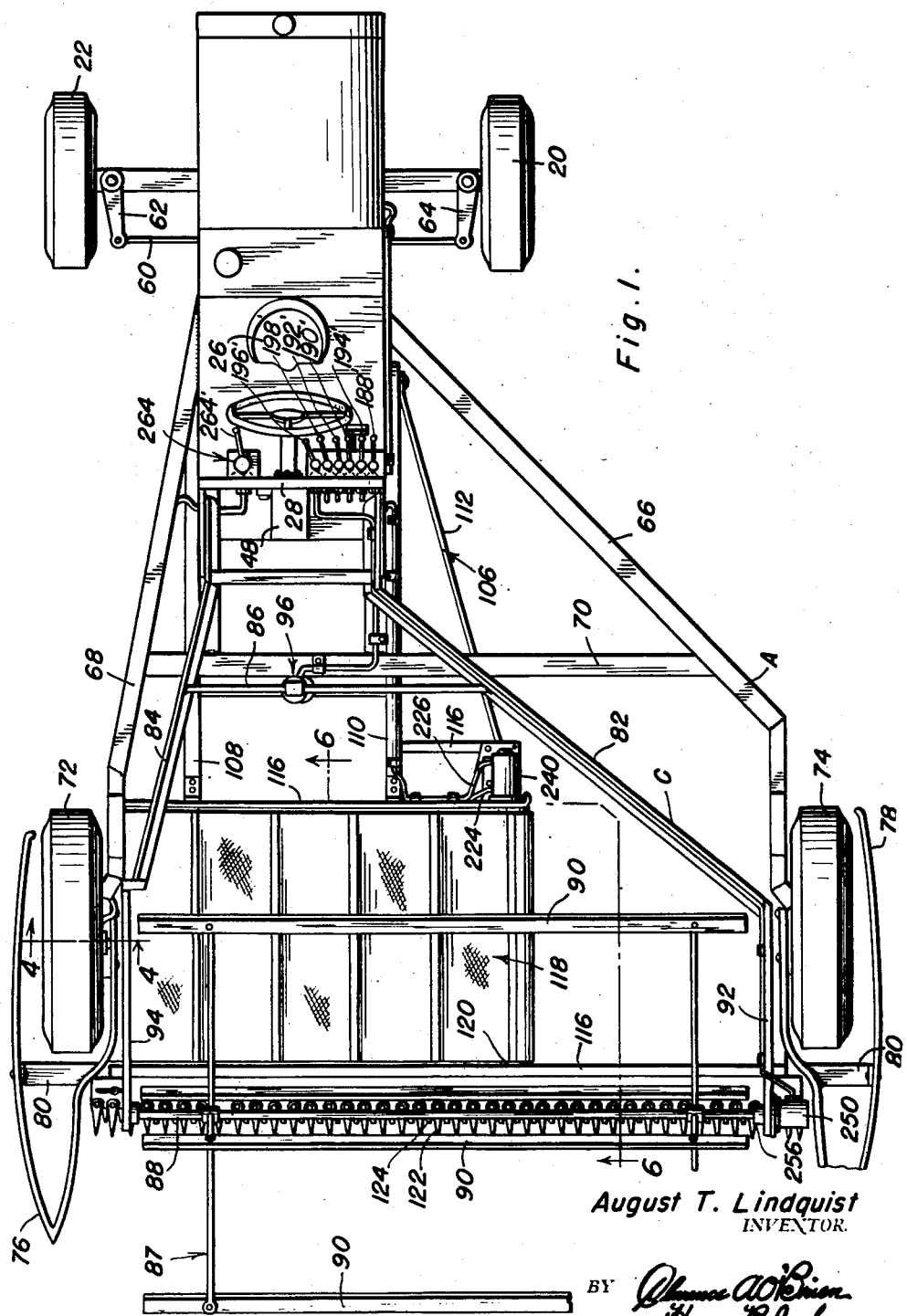

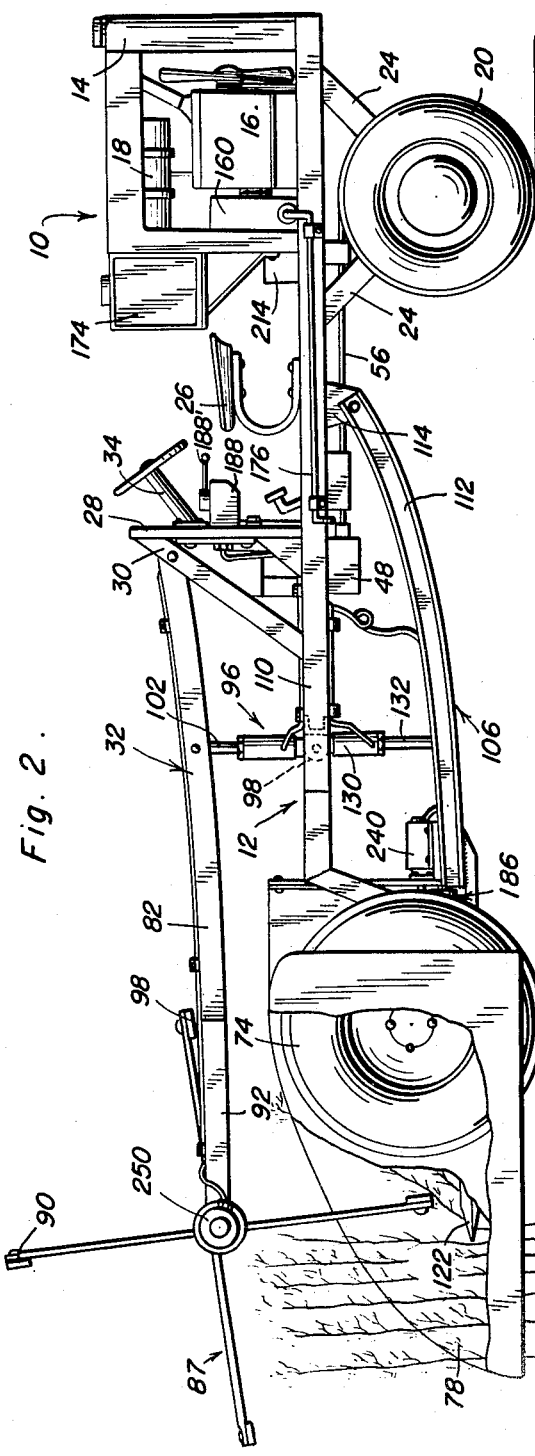

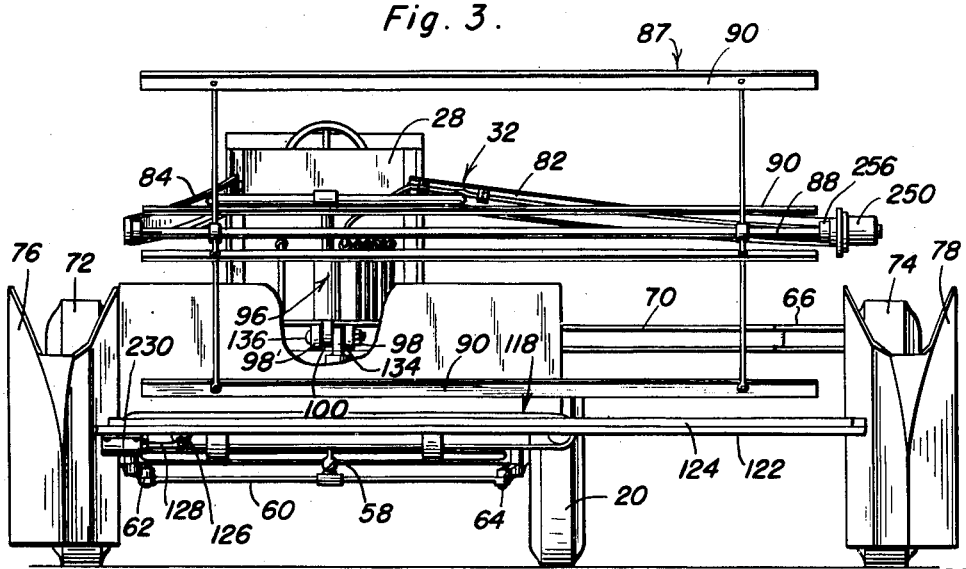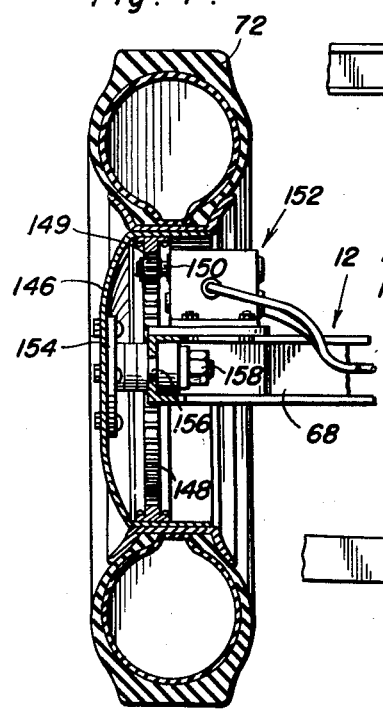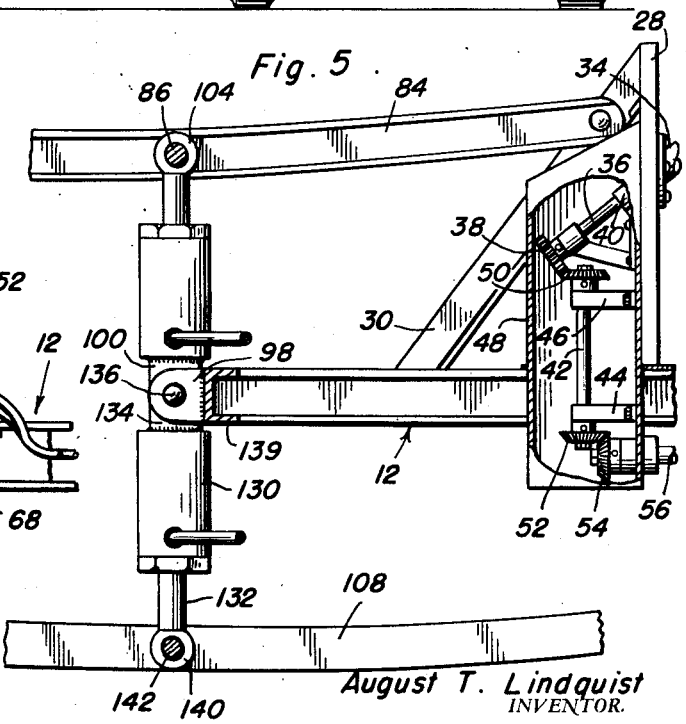

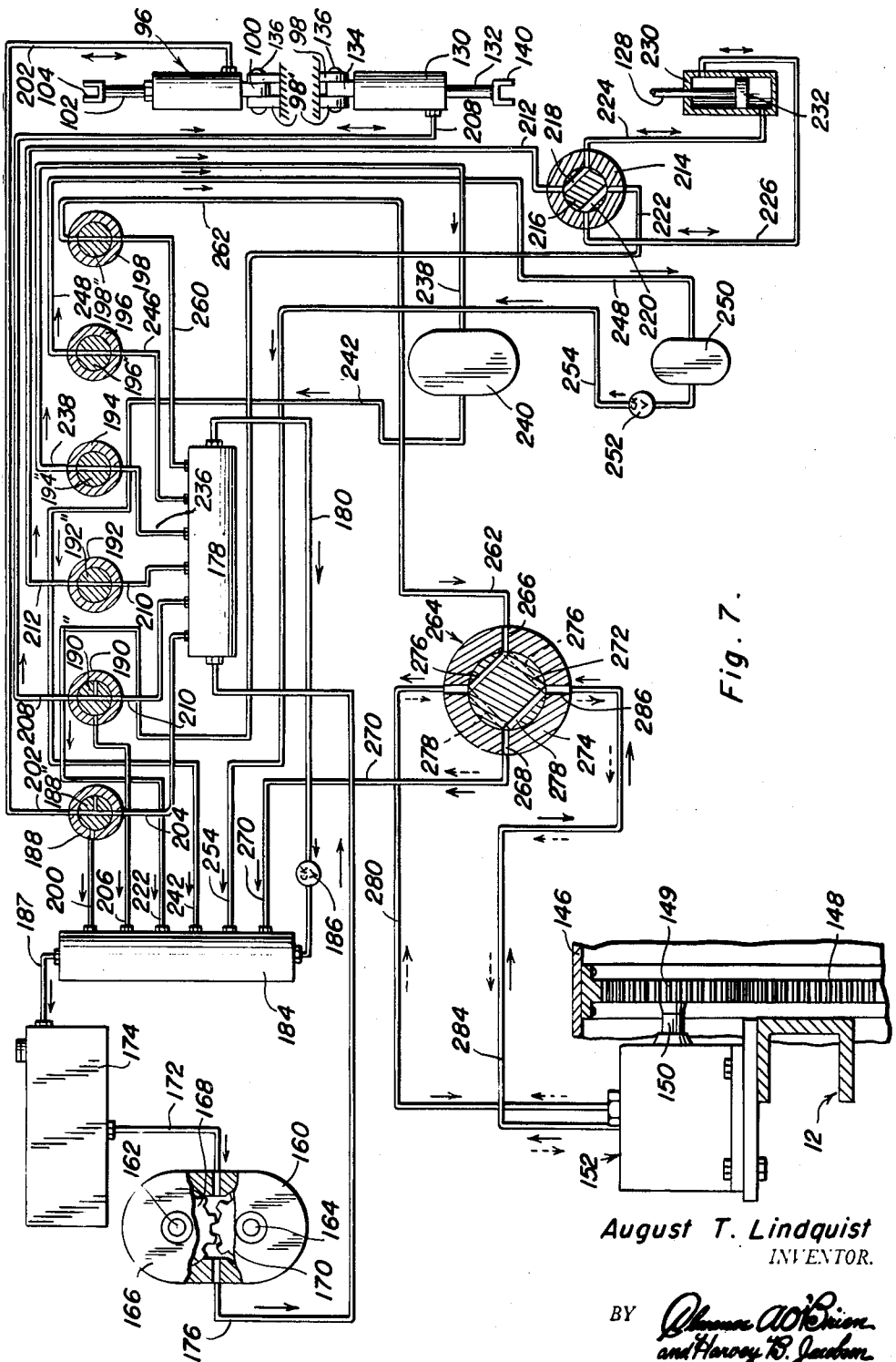

2,609,650

UNITED STATES PATENT OFFICE 2,609,650

SWATHER

August T. Lindquist, Lancaster, Minn., assignor of one-fourth to Rudolph Nelson, one-fourth to Samuel Elfstrom, and one-fourth to Joseph Leskiw, all of Lancaster, Minn.

Application August 4, 1948, Serial No. 42,358

4 Claims. (Cl. 56—23)

This invention appertains to novel and useful improvements in farm implements.

An object of this invention is to propel an improved vehicle through a field of flora, cutting the same as it is urged toward cutter blades mounted on the vehicle by two distinct means, one of which is a pair of baffles around leading wheels of the tractor while the other is a conventional reel; convey the cut flora or crop for windrowing in such a manner that it will rest between the front and rear wheels of the propelled vehicle thereby resting in a protected manner.

Another object of this invention is to actuate a cutter mechanism, reel and supports for the reel and cutting mechanism (for adjustment) by means of a common fluid impelling device, such as a pump, which is, in turn, actuated by a conventional engine mounted on the vehicle.

Another object of this invention is to propel the vehicle from the same source of fluid power and to reverse the actuation of the vehicle by a simple manipulation of a single valve.

Another object of this invention is to control the actuation of the fluid power means through the utility of a bank of conveniently located valves mounted on the vehicle.

Another object of this invention is to render it very easy and convenient to raise and lower various portions of the device, regulate the actuation of others, and control the actual operation of the entire vehicle by relatively easy manipulation of selected valves conveniently located. Ancillary to this object, it is a purpose of the invention to obviate the necessity of rotating handwheels, pulling levers which are generally difficult to operate and coupling and uncoupling various now widely used fastening devices.

A still further object of this invention is to part the crop or flora by means of a forwardly extending pair of baffles whereby the crop will not be tamped by the leading wheels of the vehicle, the crop being parted in two directions one of which is toward and into a cutting mechanism while the other direction is harmlessly to the side of the vehicle.

Another object of this invention is to pivotally mount a beam on the upper surface of a chassis of a vehicle with a reel at the end of the beam, pivotally mount a frame to the undersurface of the vehicle chassis, which frame supports a cutting mechanism, a conveyor extending transversely thereof and terminating a distance from one side of the frame, and a plurality of baffles which direct the crop in the desired manner.

Another object of this invention is to supply a pump driven by an internal combustion engine associated with the vehicle with independent fluid motivated means communicated with the pump for actuating respectively the beam and frame pivotally, the reel rotatively, the cutting apparatus reciprocatively, and the conveyor continuously.

Dependent from the previous object is the actuation of at least one wheel of the vehicle by a means which is associated with the main pump but which has an independent means interposed between the main pump and the one wheel (at least) which is used for motivating the vehicle.

Another object of this invention is to supply a device of the character to be described which is satisfactorily operative in various sub-combinations of major elements, as by obviating various features and putting the resulting device to use as an implement other than a swather and windrower.

Ancillary objects and features of novelty will become apparent to those skilled in the art, in following the description of a preferred form of the invention, illustrated in the accompanying drawings, wherein:

Figure 1 is a plan view partly broken away of the preferred form of the invention;

Figure 2 is a side view of the invention shown in Figure 1;

Figure 3 is a front view of the invention shown in Figure 1;

Figure 4 is a sectional view taken substantially on the line 4—4 of Figure 1 and in the direction of the arrows, the baffle being removed for clarity and the view being drawn to a larger scale;

Figure 5 is a sectional view of the beam, frame and chassis structure with the steering mechanism being illustrated in an operative position and the view being drawn to a larger scale;

Figure 6 is a sectional view taken on the line 6—6 of Figure 1 and in the direction of the arrows and drawn to a larger scale; and, Figure 7 is a diagrammatic view showing the fluid flow pattern and various pertinent mechanism directly connected therewith.

Various farm implements are known and utilized continually in the art. An individual utilizing such implements for a relatively long period of time finds himself rather tired not only because of the labor involved in such operations but because of the constant pulling of levers, turning of wheels and other various adjustments necessary for efficient swathing, windrowing, etc. In order to attempt to materially lessen the burden of these adjustments and manipulations, the instant invention has within its purview the utility of a completely fluid-actuated system for performing these manipulations.

In order to place a conventional farm implement vehicle in such adjusted condition that it will move in a forward and reverse direction, it is in conventional machines necessary to disengage a clutch, force a gear ratio change lever, again engage the clutch and then accelerate the prime mover or engine involved. Accordingly, it is one of the intentions of the invention to obviate substantially all of these necessary maneuvers by simply providing a single valve which is actuated in order to reverse the flow in a fluid flow system conducting such fluid to a fluid motor adjacent and driving at least one, two or even four wheels of the vehicle.

Loss of grain due to the running over of the same is occasioned in use of many implements. Constructed herewith is an assemblage of elements whereby two wheels (assume the right wheels) of the vehicle are aligned while the opposite two are out of alignment. Baffles are provided adjacent the front wheels of the vehicle which direct the flora in two directions, one of which is toward a cutting mechanism while the other of which is toward the outside of the wider or front wheels. Thus, only a very minor (comparatively) or small portion of the flora or crop is trampled by the wheels of the vehicle.

It will be noted that since two successive wheels are out of alignment, the front wheel span being wider than the rear wheel span, and since a cutter mechanism is forwardly of the front wheels, an area is cut whereby the non-aligned rear wheel will ride on ground which has had the crop or flora cut and still leave an appreciable amount of space for windrowing. Such are the benefits of non-alignment of only two wheels of the vehicle and with baffles directing the flora or grain in the proper manner.

Vehicle structure

A vehicle generally indicated at 10 is provided as the foundation or base of the present device. This vehicle includes a chassis generally indicated at 12. The chassis has at one end thereof a structure for mounting a conventional radiator 14 with a conventional internal combustion engine 16, or prime mover thereadjacent. The usual fuel tank 18 may be supplied and attached to this structure by suitable brackets. A pair of wheels 20 and 22, respectively, are slung from the rear portion of the chassis 12 by any suitable means, the braces 24 being utilized for illustrative purposes. The said wheels 20 and 22 are the turning wheels in order to steer the entire vehicle 10 and are at the rear portion of the vehicle.

A suitable seat 26 may be attached to the chassis 12 forward of the engine and facing the normal direction of movement of the vehicle.

A support which includes a dash 28 and bracing members 30 is attached forward of the seat 26 to the chassis 12 and serves many functions. One of the functions of the support is to pivotally mount a beam indicated generally at 32 while another function is to mount a bank of selector valves and a steering column 34.

In order to steer the rear wheels 20 and 22 of the vehicle, a steering rod 36 forming a portion of the steering column 34 is supplied with a suitable gear 38 at one end thereof. The column 36 may be mounted by means of a bracket 40 attached to the dash or another suitable anchorage. A counter-shaft 42 is mounted in spaced brackets 44 and 46 which are, in turn, attached to a suitable housing 48, which incidentally covers all of the gear mechanism associated with this portion of the steering apparatus. This housing 48 may be termed a gear box.

The said counter-shaft 42 has bevelled gears 50 and 52, respectively, at each end thereof, the said gear 50 engaging the gear 38 while the said gear 52 is enmeshed with another bevelled gear 54. This last-mentioned bevelled gear attaches to a suitable shaft 56 which has a drag link 58 attached at the opposite end thereof (see Figure 3). The said drag link attaches to a tie rod 60 which has turning arms 62 and 64, respectively, attached thereto by means of a pivotal connection. The said turning arms are, of course, associated with each wheel 20 and 22 by means of intermediate structure (unshown) in order to steer or turn the rear wheels 20 and 22 of the vehicle.

The chassis of the vehicle has included among its other structures a pair of diverging structural members 66 and 68, respectively, which may have a suitable strengthening element 70, any practical number of which may be used. This strengthening element extends across the vehicle chassis transversely and connects with the divergent members 66 and 68. At the ends of the said diverging members front wheels 72 and 74, respectively, are suitably journalled. It is noted that the wheel 72 and the wheel 22 follow the same track or path while the vehicle is in movement since these wheels are aligned. However, the wheels 20 and 74, respectively, are not in alignment, the wheel 20 being inwardly of the vehicle a substantial amount with relation to the wheel 74.

Attached to the chassis 12, and more specifically at the ends of the divergent members 66 and 68, is a pair of baffles 76 and 78, respectively. The said baffle 76 is identical to the baffle 78 and will be described in detail. It extends forwardly of its pertinent wheel 72 and has smoothly curved sides. At the leading or front edge of the baffle 76 the smoothly curved sides are flared to a point near the ground. The leading edge as it progresses upwardly flares outwardly in order to urge flora of any type (depending on the crop) not only in horizontal directions but also downwardly. This downward thrust of the crop urges it into a cutting mechanism which will be described elsewhere in the description. It also urges the crop into a rotating reel appropriately located for urging the grain into the reciprocating cutting apparatus or mechanism. In order to mount both baffles a suitable bracket 80 may be associated with each which attaches to the frame by means of rivets or the like at a convenient location.

Beam and reel

Structural elements 82 and 84, respectively, having suitable strengthening cross members 86 are provided and are termed a "beam" seen at 32 in Figure 2. This beam is attached at one end to the support and, more specifically, to the support members 30 in a pivotal manner. Suitable, conventional pivot pins may be used in this connection.

The said beam 32 extends forwardly of the vehicle and terminates in front of the said wheels 72 and 74. Mounted at the ends of the structural elements 82 and 84 and, consequently, at the end of the beam 32 is a conventional reel generally indicated at 87. This reel has the usual center shaft 88 as well as the various radially extending arms in order to mount the paddles 90 thereon.

Provided as an extension at the ends of the converging structural members 62 and 64 are substantially parallel portions 92 and 94 which actually form a portion of the beam and form a sound structure from an engineering viewpoint. A similar condition is present in the chassis structure at the ends of the diverging structural members 66 and 68.

A ram, preferably of the piston-cylinder type, seen at 96 is used for the purpose of raising and lowering the beam pivotally. Due to the pivotal movement of the beam 32, and since the piston-cylinder structure is spaced from the pivot point of the beam, it is necessary that the entire piston-cylinder structure be pivotally mounted, and for this structure attention is directed to Figure 7. It is proposed to utilize perches 98, 98' which are spaced slightly from each other and to depend a bracket 100 therebetween. By utility of the conventional pivot pin 136 through the perches and the bracket 100, the bracket and, consequently, the cylinder structure which is firmly attached to the bracket, is pivotally associated with the chassis 12. Of course, the piston rod 102 may have a U-shaped bearing 104 at the end thereof in order to pivotally attach to one of the cross stiffening members 86.

*Cutting apparatus, conveyor, and frame for support thereof*

A frame generally indicated at 106 is provided under the chassis 12. This frame includes longitudinally extending structural members 108 and 110, respectively, with a side member 112 attached to the structural member 110. As is seen in Figure 2, the frame is generally arcuate shaped and is pivotally mounted at one end thereof to depending brackets 114 which are secured to the undersurface of the chassis 12. The said frame has a structural bed formed at the forward end thereof which includes various members 116 rigidly attached together as by welding, braising or the like. It is in this bed at the forward portion of the frame 106 that an endless conveyor generally indicated at 118 is suitably journalled. The said endless conveyor has a live shaft 120 at one end thereof and an idler shaft at the opposite end thereof. The said live shaft 120 is journalled in two members of the bed as is the idler shaft in connection with the endless conveyor. A suitable conveyor belt which may be latticed extends around rollers mounted on the shafts.

Inspection of Figure 1 discloses that the endless conveyor terminates adjacent one side of the frame 106 and at a distance from the opposite side thereof. This, of course, leaves the space whereby flora may be conveyed laterally across the frame 106 but not the full distance. Thus, grain may be deposited in the track-way formed between the travelling wheel 20 and wheel 74.

The cutter mechanism is of a conventional reciprocatory type, including a stationary cutter bar 122 mounted on one of the frame bed members 116 and a sliding cutting bar 124 suitably positioned in association with the stationary cutting element 122. Means for reciprocating the movable cutting bar 124 among other structure includes a small bracket 126 which depends therefrom and a piston rod 128 which is pivotally associated therewith.

The cutting apparatus is positioned forwardly of the endless conveyor and substantially immediately below the rotating reel. Thus, grain or other type flora may be urged downwardly by the rotating reel into the actual cutter apparatus, after which it is conveyed on the endless conveyer in the manner described above.

Means for pivotally actuating and thus raising and lowering the frame 106 is provided. The preferable means consists of a cylinder, among other structure, seen at 130, with a piston and piston rod 132 reciprocatively mounted therein. For this structure attention is directed to Figure 7 where it is obvious that a bracket 134 is rigidly attached to the cylinder 130 and has the pivot pin 136 extending therefrom. As is shown diagrammatically in Figure 7, the piston and cylinder structure in this instance is pivotally mounted, and as is shown in reality in Figure 5, the pivot pin 136 mounts both the bracket 100 and the bracket 134 commonly. The perches 98, 98' are common to both of the brackets, this being a structural expedient to reduce expense, cost of production and render the device compact. The said perches 98, 98' are attached rigidly to a cross member 139 of the said chassis 12. The piston rod has a bearing 140 at one end thereof accommodating a pivot pin 142 which attaches across suitable portions of the frame 106, thereby rendering it possible to actually pivotally raise and lower the said frame.

*Vehicle motive means*

In order to actually impart movement to the vehicle, at least one of the wheels is provided with the following structure:

A wheel (72 for illustrative purposes) has the usual hub 146 associated therewith with a ring gear 148 rigidly attached therein. This ring gear has a pinion 149 enmeshed therewith, and the said pinion is attached to a shaft 150. The said shaft 150 terminates in a fluid motor generally indicated at 152 for imparting torque to the shaft and, consequently, rotative movement to the drum 146.

The said hub may have a boss 154 rigidly attached thereto but in a detachable fashion, and a wheel spindle 156 is mounted in the boss 154. A castle-nut 158 backed by suitable thrust bearings (unnumbered) may be interposed between a portion of the chassis 12 and the castle-nut or the like in order to maintain the spindle in position. Of course, it is within the purview of the invention to attach the spindle rigidly to the frame at the appropriate place and simply mount the hub 146 and boss 154 thereon through the medium of conventional wheel bearings.

It is noted by inspection of Figure 4 that all that is necessary to remove the entire wheel and hub from operative association with the remainder of the vehicle is to remove the lug nuts and/or lugs, and slide the ring gear from its enmeshed relation with the pinion.

If it is found advantageous, desirable or necessary in certain instances, the two wheels 72 and 74, respectively, may be provided with similar structure, and it is also within the purview of the invention to supply the wheels 20 and 22 with a driving mechanism, this being a matter of expediency.

*Fluid flow and control apparatus*

Attention is now directed to Figure 7 for a diagrammatic representation of the means for actuating the frame pivotally; the beam pivotally; the reel rotatively; the cutter reciprocatively; and the driving wheel or wheels rotatively in either the clockwise or counter-clockwise direction.

A positive displacement pump 160 is shown with two shafts 162 and 164, respectively, associated therewith. The shafts extend through a suitable housing 166 which has appropriate body openings to accommodate the gears 168 and 170 of the positive or constant displacement gear pump. One of the shafts is attached to the crank shaft of the engine 16 whence torque is derived.

A pipe 172 is attached to the inlet side of the pump 160 and to a reservoir 174 which accommodates a supply of liquid. An outlet conduit 176 attaches to the outlet port or side of the main pump 160 and terminates in a pressure manifold 178. A conduit 180 leading from the pressure manifold terminates in a plenum chamber 184, and a check valve 186 is interposed in this last-mentioned conduit 180. A lead extending from the opposite end of the plenum chamber and indicated at 187 connects with the reservoir, thereby forming a complete circuit. Fluid may be pumped by means of the pump 160 from the reservoir to the pressure manifold, then through the check valve and conduit associated therewith, whence the fluid extends through the plenum chamber and back into the reservoir. This recirculation is used frequently in various manipulations of valves to be described subsequently.

There are six manually operative core valves provided in the system, indicated respectively at 188, 190, 192, 194, 196, and 198 operative by handles 188', 190', 192', 194', 196', 198', respectively. Each of the valves serves a specific function in relation to the fluid flow system and the valve 188 and its appurtenant mechanism will be described at this time. A lead 200 extends from the plenum chamber 184 and terminates in the port (unnumbered) provided in the valve for this purpose. The core 188" of this valve has a substantially T-shaped passage therein in order to selectively communicate the pipe or conduit 202 and 204, respectively, with the conduit 200 and also to communicate the conduits 202 and 204 with each other. It is obvious that simple manipulation of handle 188' connected with the core 188" of the valve 188 will serve this purpose and function.

The conduit 202 extends to an opening in the cylinder of the cylinder-piston construction 96 in order to conduct fluid from the pressure manifold 178 through the conduit 204, through the valve 188 and then to the cylinder. This, of course, urges the piston rod 102 from the cylinder and raises the beam 32. When the beam is in the desired elevated position, the valve core is turned slightly manually cutting off flow from the pump 160 to the cylinder-piston structure 76. When the valve core 188" is turned further, the passages align in such a manner as to allow fluid to return from the piston-cylinder structure 96 to the plenum chamber. Further rotation communicates the conduit 204 and the conduit 202 to allow recirculation from the pump 160 through the pressure manifold, through the conduit 204, thence through the pipe 200 and into the plenum chamber. Of course, the weight of the beam is used to advantage in this connection to force the fluid from the piston-cylinder structure seen at 96 in lowering the same.

Referring now to the valve 190, a conduit 206 extends from the plenum chamber to the inlet side of the valve 190. Substantially T-shaped passages are provided in the core 190" of the valve to align conduits 208 and 210 as well as the pipe 206 in various manners. The mannerisms of alignment are identical to those described in connection with the valve 188.

In this structure fluid may extend through the pressure manifold (which is charged by the pump), through the pipe 210, through the passages of the valve core and then through the conduit 208 which terminates in the cylinder 130. Thus, the piston rod 132 may be raised by means of the fluid reacting on the piston rod side of the piston head (valve setting as seen in Figure 7) until such time that the frame is in the desired elevated position.

When it is desired to maintain the frame in the selected position, the valve core 190" is turned by handle 190' slightly shutting off all passages in the valve 190. In order to drain the liquid from the cylinder 130, the valve core 190" is rotated slightly until the conduits 206 and 208 are communicated with each other. The weight of the frame and the mechanism carried thereby forces the fluid in this instance.

For recirculation the valve core 190" is turned slightly further, thereby communicating the conduits 210 and 206 and permitting the charged (under pressure) fluid in the pressure manifold to flow harmlessly through the valve and into the plenum chamber.

The valve 192 differs in structure slightly from the previously described valves in that the passage in the core 192" thereof is straight. The conduit or line 210 extends from the pressure manifold and communicates with the inlet side of the valve 192. When the valve core 192" is in a position as shown in Figure 7, fluid will extend through the said valve 192 and into the conduit 212 which terminates in a valve housing 214. The core 216 within the valve chamber of the housing 214 has substantially parallel passages 218 and 220 therein, and there are four ports formed in the valve housing 214. These four ports may be radially positioned, one accommodating the conduit 212, while an opposed port accommodates the conduit 222. Extending substantially normal to the aligned or opposed ports is another pair of aligned ports having pipes or conduits 224 and 226, respectively, in communication therewith.

This particular valve structure with the valve housing 214 and core 216 is of the rotating type, the core constantly rotating in a single direction by any suitable means which may be operatively connected with the engine 16 or the pump 160. Fluid from the pressure manifold 178 entering the valve housing 214 through the medium of the conduit 212 is directed selectively into the conduits 224 and 226 by alignment of the passages 218 and 220, first with the conduit 212 and the conduit 224 and then with the conduit 212 and the conduit 226.

When fluid is introduced into the cylinder 230 having the piston 232 with the piston rod 128 (also see Figure 3) therein, the piston rod is urged in a single direction which happens to be in this instance outwardly of the cylinder 230. The fluid which would normally be trapped above the piston must have an exit, and, therefore, it is urged through the conduit 226 and into the conduit 222 through the medium of the passage 220 formed in the valve core which constantly rotates and which is seen at 216.

On the other hand, when the conduit 212 is communicated with the conduit 226, the fluid is introduced into the cylinder 230 at the upper portion of the piston head 232, thereby urging the piston rod 128 and piston head 232 downwardly or within the cylinder 230. The fluid trapped beneath the piston head 232 must have an exit, which will be by means of one of the passages 218 or 220 which intercommunicates the conduit 224 and the conduit 222.

The said conduit 222, as is seen in Figure 7, follows a devious travel but terminates in the plenum chamber for recirculation.

When the valve core 192" in the valve 192 is rotated slightly recirculation with regard to main pump 160 is permitted through various other conduits previously described. Of course, if it is found desirable to have a recirculation system in conjunction with the fluid motor formed by the rotating valve structure and the piston 232-cylinder 230 structure, another conduit and port may be formed in association with the valve 192 which leads to the plenum chamber and the valve core 192" in the valve 192 may be provided with a T-shaped channel or passage identical with the valve structures seen at 188 and 190, respectively.

Attention is now directed to the valve structure seen at 194, which is identical in itself to that seen in 192 and described above. A conduit 236 extends from the pressure manifold to the inlet side of the valve structure 194, and a conduit 238 extends from the outlet side of the valve structure 194, terminating in a fluid motor inlet, the fluid motor being designated at 240. The utility of the fluid motor is to actuate the conveyor mechanism (see Figure 1). The drive shaft of the said fluid motor 240 connects directly with the live shaft 120 for actuation thereof, thereby motivating the endless conveyor belt which is positioned thereon. This fluid motor may be of the gear type, or if it is found desirable, the fluid motor may be of the vane or impeller type, this being a matter of choice.

A conduit 242 extends from the said fluid motor 240 and terminates in the plenum chamber 184. Fluid under pressure from the pressure manifold may flow through the substantially straight passage in the valve core 194" of the valve structure 194 and actuate the fluid motor for subsequent actuation of the endless conveyor 112. After the said fluid in the fluid motor has served its purpose, it may flow through the conduit 242 into the plenum chamber for recirculation by the main pump 160. When the valve core 194" in the valve structure 194 is turned a small amount, the said conduit 238 does not receive liquid from the pressure manifold, the fluid simply recirculating through the conduit 180, the check valve 186 and into the plenum chamber 184.

Attention is now directed to the valve 196 which has at its inlet side a conduit 246 extending from the pressure manifold in order to conduct fluid through the valve structure. The straight passage is provided in the core 196" of valve 196 as in the valve structures of 192 and 194, respectively. A conduit 248 extends from the opposite side of the valve structure in order to permit fluid to flow into a second fluid motor 250. This fluid motor may be of any conventional type and is utilized for the purpose of actuating the reel 87. A check valve 252 serving its usual and conventional function is interposed in the line 254, which is attached to the outlet side of the fluid motor 250 at one end thereof and to the plenum chamber 184 at the other end thereof.

The said main shaft 88 of the reel is integrally associated with the rotor shaft of the fluid motor by any suitable means such as a coupling 256 for imparting rotative movement to the reel.

As fluid flows from the pressure manifold, it is allowed two alternatives. The first is to flow through the passage aligning the conduits 246 and 248, under which conditions the fluid motor 250 is actuated and the exhaust fluid received in the plenum chamber for recirculation. The other alternative is to turn the valve core 196" a slight amount, thereby cutting off the source of power to the fluid motor 250 and permitting fluid simply to recirculate through the conduit 180, check valve 186 and plenum chamber.

Referring to the final valve of this series 198, it will be seen that a conduit or pipe 260 attaches to the pressure manifold and to the inlet side of the valve structure 198. The passage which is in the valve core 198" is substantially straight and may be in the form of a slot or a bore. A second conduit 262 attaches to the outlet side of the valve structure 198 and terminates in a reversing valve mechanism generally indicated at 264 and operated by a handle 264'. A set of opposed ports are provided in this reversing valve structure which are indicated at 266 and 268, respectively. The conduit 262 intercommunicates with the port 266, while the port 268 has a pipe or conduit 270 attached thereto, terminating in the plenum chamber.

The valve core 272, which is rotatively received in the valve chamber of the housing 274 of the said valve structure 264, has a number of chordal passages therein, two of which are indicated at 276 and 278, respectively.

Fluid from the pressure manifold through the valve structure 198 extends through one of the passages 276, for illustrative purposes, thereby intercommunicating the conduit 262 and a conduit or line 280. Thus, fluid from the pressure manifold when the reversing valve structure 264 is in the position as shown in Figure 7, flows to a fluid motor which may be of any suitable type seen at 152 and also in Figure 4. It is noted that the conduit 280 communicates with one side of the fluid motor 152 in order to urge or actuate the pinion 149 in a predetermined direction. The exhaust fluid from the fluid motor 152 then extends through the outlet side or other side of the fluid motor 152 and through a conduit 284 which terminates in communication with a port 286. This last-mentioned port is supplied in the said housing 274. In the setting of the valve 264 as shown in Figure 7, the said passage 278 communicates directly with the ports 286 and 268, thereby allowing exhaust (in this instance) fluid to return through the line 270 into the plenum chamber for recirculation.

When it is desired to reverse the direction of rotation of the fluid motor 152, the core 272 is rotated through an angle of substantially 90°, by the handle 264' thereby placing the passages 276 and 278, respectively, in the positions shown in dotted lines. In that event the intake line 262 for the valve structure 264 communicates with the conduit 284 through the medium of the passage 276, thereby introducing fluid into the fluid motor. This introduction is at the side or port which was formerly the outlet side but has now been transposed to the inlet side. Accordingly, rotation of the drive shaft 150 and, consequently, pinion 149 is in a direction opposite that under the different valve setting. Exhaust fluid then flows through the line 280, through the passage 278 and then through the conduit 270 into the plenum chamber for subsequent recirculation.

By this means direction of rotation of the pinion 149 is easily and conveniently reversed, thereby urging the wheel associated with the pinion 149 in selected directions.

Operation

Upon actuation of the vehicle through a crop which includes flora or other substance adaptable for harvesting including swathing and windrowing, various individual operations and sub-operations are realized. The initial operation is to urge the growing crop in such a manner that it will contact the cutting edges of the cutter mechanism. Accordingly, the baffles 76 and 78 operate effectively upon movement of the vehicle through the field or crop. The reel being located immediately above the cutter apparatus also urges the crop downwardly and toward the cutter mechanism.

In the event that certain types of crop desired to be cut or for other reasons, the cutter mechanism should be raised a predetermined distance above the ground, simple manipulation of the valve structure 190 is all that is necessary to set the fluid flow system into motion in this connection. Then, the cutter mechanism is raised as described hereinbefore.

In order to regulate the distance of the paddles 90 of the reel from the actual cutting mechanism, manipulation of the valve operating handle 188' associated with the valve mechanism 188 is all that is necessary to set the fluid flow mechanism into operation which is pertinent to this portion of the device. Then, the beam 32 is selectively raised and lowered as desired, carrying with it the reel.

In the main, flexible conduits are used for the reason that there are a few pivotal movements necessary for the effective operation of the device, and complicated gearing and linkages are obviated by this expedient.

For actuation of the actual reel and the actual cutter mechanism, all that is necessary is to actuate a valve handle setting forth the various individual fluid actuated mechanisms to serve this purpose.

It may be desirable to move the device forward and backward selectively, and, accordingly, manipulation of the valve handle 264' associated with the valve structure 264 in the manner suggested above is all that is necessary.

After the grain or other flora has been cut, the reel accompanied by the forward motion of the vehicle urges the cut grain or the like on the endless conveyor seen at 118 which is set in motion simply by rotating a valve core by a handle, thereby carrying the cut grain into the area defined by the edge of the frame adjacent the wheel 74 and the closest end of the endless conveyor.

Inspection of Figure 1 discloses that only a portion of the cut grain will fall on the conveyor to be stacked on the other portion which is cut and does not fall on the said endless conveyor. Otherwise spoken, a portion of the grain is cut by the cutter mechanism and urged downwardly into a row untouched by the wheels 74 and 20. Then, the other portion of the grain simultaneously cut by means of the cutter mechanism is urged on top of this said first-mentioned cut grain, thereby forming a row which will not be effected or touched by the wheels 20 and 74. Of course, the wheels on the other side of the vehicle are not pertinent to this portion of the operation as they are spaced a considerable distance from the row formed by the conveyor movement and operation.

In a single cycle of operation of the vehicle in a field, it will be seen that the wheel 72 has the wheel 22 following in substantially the same track. The grain or other flora immediately pertinent this movement and in this particular path is brushed aside by means of the baffle 76. Accordingly, only a very minor and small portion of the grain is injured. A row of cut grain is formed, as described above, after it is carried off of the endless conveyor 178. Thus, the resulting field after a single pass of the device over the field will have a row of cut grain with an opening in the field somewhat smaller than the width of the entire vehicle. By placing the baffle 78 adjacent the yet growing or standing grain or other flora, a second path may be cut in the field and a second row of cut flora or crop formed in the field. Upon completion of the cutting operations for the entire field, substantially straight rows of crop are found which may easily be removed by other conventional apparatus such as a baler.

Of course, brakes and other conventional apparatus may be applied to the device as desired. Also, other variations may be made without departing from the spirit of the invention.

Having described the invention, what is claimed as new is:

1. A swather comprising a chassis having wheels and an engine mounted thereon, a frame pivotally attached to and disposed beneath said chassis and a flora cutting apparatus mounted on said frame, an upstanding support secured to said chassis and a beam pivotally secured to said support and disposed above said chassis, a reel mounted for rotation on said beam, a pump actuated by the prime mover, a fluid motor for actuating said reel, a conduit connecting said pump and said motor, a valve in said conduit, means connected with said pump for actuating said cutting apparatus including a fluid motor, pipes extending from said fluid motor, a flow reversing valve secured to said last-mentioned fluid motor, and a conduit connecting said pump and said flow reversing valve.

2. A swather comprising a chassis having wheels and an engine mounted thereon, a frame pivotally attached to and disposed below said chassis and a flora cutting apparatus mounting on said frame, an upwardly extending support secured to said chassis and a beam pivotally secured to said support and disposed above said chassis, a reel mounted for rotation on said beam, a pump actuated by the prime mover, a fluid motor for actuating said reel, a conduit connecting said pump and said motor, a valve in said conduit, means connected with said pump for actuating said cutting apparatus including a fluid motor, pipes extending from said fluid motor, a flow reversing valve secured to said last-mentioned fluid motor, and a conduit connecting said pump and said flow reversing valve, a conveyor secured to and extending partially across said frame, and fluid actuated means motivated by said pump for activating said conveyor, including a conduit and manual fluid flow control means in said conduit.

3. In a farm implement which includes a chassis, an engine, wheels mounted on said chassis, a beam pivoted to the upper portion of the chassis and having a fluid motor actuated reel rotatively mounted thereon, a frame pivotally mounted on the under portion of said chassis and having a fluid motor actuated cutter mechanism and a fluid motor actuated conveyor attached thereto, rams attached to said chassis and said frame and beam, respectively, to raise and lower said frame and beam, a pump mounted on said chassis and actuated by the engine, and conduits connecting said pump and said rams, the motor actuated reel and cutter and conveyor.

4. A swather comprising a wheel supported chassis, a beam pivotally mounted thereon and extending forwardly thereof and longitudinally over the same, a frame pivotally mounted thereunder and extending forwardly thereof and longitudinally under the same, a reel mounted for rotation on said beam, a reciprocatory cutting apparatus mounted on said frame, a conveyor mounted on said frame and extending partially across said frame, an engine mounted on said chassis and a pump driven by said engine, and independent fluid motivated means communicated with said pump for actuating respectively said beam, frame, reel, cutting apparatus and conveyor.

AUGUST T. LINDQUIST.

REFERENCES CITED

The following references are of record in the file of this patent:

UNITED STATES PATENTS

| Number | Name | Date |
|---|---|---|
| 108,069 | Wagner | Oct. 4, 1870 |
| 1,154,493 | Drygas | Sept. 21, 1915 |
| 1,447,823 | Thomas | Mar. 6, 1923 |
| 1,682,781 | Gardner | Sept. 4, 1928 |
| 1,958,405 | Anthony | May 15, 1934 |
| 2,171,761 | Paradise et al. | Sept. 5, 1939 |
| 2,318,409 | Millard et al. | May 4, 1943 |
| 2,456,237 | Acton | Dec. 14, 1948 |
| 2,501,424 | Ufer | Mar. 21, 1950 |